(12) United States Patent
Sun

(10) Patent No.: US 10,409,137 B2
(45) Date of Patent: Sep. 10, 2019

(54) SYSTEM AND METHOD FOR CONTROLLING ENERGY FLUX MODULATION

(71) Applicant: Chen-Kuo Sun, Escondido, CA (US)

(72) Inventor: Chen-Kuo Sun, Escondido, CA (US)

( * ) Notice: Subject to any disclaimer, the term of this patent is extended or adjusted under 35 U.S.C. 154(b) by 0 days.

(21) Appl. No.: 16/018,663

(22) Filed: Jun. 26, 2018

(65) Prior Publication Data

US 2019/0064633 A1 Feb. 28, 2019

Related U.S. Application Data

(63) Continuation-in-part of application No. 15/870,614, filed on Jan. 12, 2018, now Pat. No. 10,036,855, which is a continuation-in-part of application No. 15/683,112, filed on Aug. 22, 2017, now Pat. No. 10,126,496.

(51) Int. Cl.
*G02F 1/313* (2006.01)
*G02F 1/225* (2006.01)
*G02F 1/065* (2006.01)
*G02F 1/025* (2006.01)

(52) U.S. Cl.
CPC ............ *G02F 1/3133* (2013.01); *G02F 1/025* (2013.01); *G02F 1/065* (2013.01); *G02F 1/2257* (2013.01)

(58) Field of Classification Search
CPC .................................................... G02F 1/3313
See application file for complete search history.

(56) References Cited

U.S. PATENT DOCUMENTS

| 4,001,744 A | 1/1977 | Conrad |
| 4,008,947 A | 2/1977 | Baues |
| 4,127,320 A * | 11/1978 | Li ............... G02F 1/3137 385/16 |
| 4,240,693 A | 12/1980 | Johnson |

(Continued)

FOREIGN PATENT DOCUMENTS

| CN | 2071793 U | 2/1991 |
| JP | 07043656 A | 2/1995 |

(Continued)

OTHER PUBLICATIONS

Hui Yu et al., "Performance tradeoff between lateral and interdigitated doping patterns for high speed carrier-depletion based silicon modulators", Optical Express, Jun. 4, 2012, vol. 20, No. 12, pp. 12926-12938.

(Continued)

*Primary Examiner* — Rhonda S Peace
(74) *Attorney, Agent, or Firm* — Nydegger & Associates

(57) ABSTRACT

A system and method for controlling the energy flux of a light beam (carrier wave) relies on the manipulation of a light beam's Poynting vector to switch the light beam from one optical waveguide to another. A modulator positioned between the two waveguides has an index of refraction n+ik wherein ik is a loss/gain component. It is the manipulation of this loss/gain component ik by an external stimulus which causes anisotropic changes in orthogonal components of the light beam's Poynting vector. This, in turn, causes changes in the propagation distance of the light beam (carrier wave) over a length L along the waveguides that switch the light beam from one waveguide to the other.

13 Claims, 8 Drawing Sheets

(56) References Cited

U.S. PATENT DOCUMENTS

| | | | |
|---|---|---|---|
| 4,525,687 A | 6/1985 | Chemla | |
| 4,728,167 A * | 3/1988 | Soref | G02F 1/025 385/130 |
| 4,840,446 A | 6/1989 | Nakamura | |
| 5,004,447 A | 4/1991 | Soref | |
| 5,159,699 A | 10/1992 | de Monts | |
| 5,917,980 A | 6/1999 | Yoshimura | |
| 5,937,115 A | 8/1999 | Domash | |
| 5,970,186 A * | 10/1999 | Kenney | G02F 1/3132 385/122 |
| 6,310,999 B1 | 10/2001 | Marcuse | |
| 6,836,585 B2 | 12/2004 | Trissel | |
| 6,928,248 B2 | 8/2005 | Achour | |
| 7,860,358 B2 | 12/2010 | Tsuda | |
| 9,046,704 B2 | 6/2015 | Costache | |
| 10,036,855 B1 * | 7/2018 | Sun | G02F 1/015 |
| 10,126,496 B1 * | 11/2018 | Sun | G02B 6/12 |
| 2003/0219197 A1 | 11/2003 | Kawamoto | |
| 2003/0223698 A1 * | 12/2003 | Nicolaescu | G02B 6/126 385/50 |
| 2003/0231394 A1 | 12/2003 | Kimura | |
| 2004/0240784 A1 | 12/2004 | Shih | |
| 2004/0247236 A1 | 12/2004 | Yoshimura | |
| 2005/0254752 A1 | 11/2005 | Domash | |
| 2006/0261432 A1 | 11/2006 | Yoshimura | |
| 2007/0014519 A1 | 1/2007 | Aoki | |
| 2009/0263078 A1 | 10/2009 | Hosomi | |
| 2013/0034323 A1 | 2/2013 | Costache | |
| 2014/0226974 A1 | 8/2014 | Sun | |
| 2015/0093067 A1 | 4/2015 | Manouvrier | |
| 2017/0269454 A1 | 9/2017 | Sun | |
| 2017/0336658 A1 | 11/2017 | Chen | |
| 2019/0064633 A1 * | 2/2019 | Sun | G02F 1/025 |

FOREIGN PATENT DOCUMENTS

| | | |
|---|---|---|
| JP | 11237652 A | 8/1999 |
| SU | 1118878 A1 | 10/1984 |

OTHER PUBLICATIONS

F. Dollinger et al., "Ultrashort low-loss optical multiquantum-well GaAs/GaAlAs vertical directional coupler switch", Electronics Letters, Aug. 1, 1996, vol. 32, No. 16, p. 1509.

Asaki Kohtoku et al., "Switching Operation in a GaInAs—InP MQW Integrated-Twin-Guide (ITG) Optical Switch", IEEE Photonics Technology Letters, Mar. 1991, vol. 3, No. 3, pp. 225-226.

Masaki Kohtoku et al., "High-Speed InGaAlAs—InAlAs MQW Directional Coupler Waveguide Switch Modules Integrated with a Spotsize Converter Having a Lateral Taper, Thin-Film Core, and Ridge", Journal of Lightwave Technology, Mar. 2000, vol. 18, No. 3, pp. 360-369.

Herrera et al., "Silicon / electro-optic polymer hybrid directional coupler switch", Optical Interconnects XIV, 2014, Proc. of SPIE vol. 8991, pp. 89910Q-1-89910Q-8.

Stegmaier et al., "Broadband directional coupling in aluminum nitride nanophotonic circuits", Optics Express 7304, Mar. 25, 2013, vol. 21, No. 6.

Qiu et al., "A hybrid electro-optic polymer and TiO2 double-slot waveguide modulator", Scientific Reports, 5:8561, DOI 10.1038, srep08561.

* cited by examiner

SYSTEM AND METHOD FOR CONTROLLING ENERGY FLUX MODULATION

This application is a continuation-in-part of application Ser. No. 15/870,614, filed Jan. 12, 2018, which is currently pending, and which is a continuation-in-part of application Ser. No. 15/883,112, filed Aug. 22, 2017, which is currently pending. The contents of application Ser. Nos. 15/870,614 and 15/683,112 are incorporated herein by reference.

FIELD OF THE INVENTION

The present invention pertains generally to systems and methods for switching optical signals from one optical waveguide to another. More particularly, the present invention pertains to systems and methods for switching and modulating optical signals that have already been modulated by their second order mode as well as higher order modes as they transit a waveguide. The present invention is particularly, but not exclusively, useful for systems and methods that employ optical switches, wherein the switching element of the optical switch is a reverse bias diode.

BACKGROUND OF THE INVENTION

By definition, a PN junction is the interface between two regions in a semiconductor crystal which have been treated (i.e. doped) so that one region is a P-type semiconductor and the other is an N-type semiconductor; it contains a permanent dipole charge layer (McGraw-Hill Dictionary of Scientific and Technical Terms: Sixth Edition 2003). More particularly, from a technical perspective, the P-type region includes "holes" arid the N-type region includes "electrons". In this combination, the permanent dipole charge layer (i.e. a space charge layer) is located between the regions.

As its nomenclature suggests, the space charge layer between the P-type region and the N-type region will be charged. Further, it will have a depletion width, $W_d$, that is initially determined by the electrical characteristics of the P-type and N-type regions. Importantly, it is known according to the plasma dispersion effect that the index of refraction of a semiconductor material will change as its free carrier concentration is changed. Therefore, the effective refractive index, n, of the PN diode will change as the depletion width $W_d$ is changed. It happens that these changes can be induced electronically by the application of an external voltage.

It is well known that semiconductor materials exhibit a phenomenon that is known as the plasma dispersion effect. In brief, this effect is related to the density of free electron carriers in a semiconductor material. More specifically, this free electron density is determined by the concentration of "electrons" in the N-type region of a PN junction, and by the concentration of "holes" in the N-type region of the PN junction. Of particular interest for the present invention is how the plasma dispersion effect changes the index of refraction of a semiconductor material, and the affect this change will have on an optical signal as it passes through a PN junction.

Along with a consideration of PN junctions as mentioned above, the characteristics of optical waveguides are also important for the present invention. In particular, the interest here is on the nature of light beams and their interaction with an optical waveguide. First, consider a single mode light beam which has no higher order modes and exhibits only what is generally referred to as the fundamental mode. As a distinguishing feature, it is well known that unlike a multimode light beam which always includes a fundamental mode together with higher order modes, a single mode light beam will follow a straight line path through an optical waveguide. On the other hand, a higher order mode light beam (e.g. second order mode) primarily will follow a sinusoidal path which passes back and forth across a center line through the optical waveguide due to mode propagation interference.

The present invention has recognized several possibilities from the technical considerations mentioned above that lead toward the use of an optical waveguide as a reverse bias switching/modulating diode. For one, the present invention recognizes that an optical waveguide, which is made of a semiconductor material (e.g. silicon), can be "doped" to create a PN junction. Specifically, both a P-type region and an N-type region, with a space charge layer therebetween, can be manufactured as an optical waveguide to effectively create a waveguide/diode. For another, the present invention recognizes that by introducing a higher order mode optical signal (e.g. second order) into the waveguide/diode, the sinusoidal beam path of the optical signal will cause it to transit back and forth through the space charge region. By changing the external voltage, the depletion width $W_d$ and its corresponding effective index n of the diode will change, and the beam path of the optical signal will be cumulatively changed as it passes back and forth through the space charge region in the waveguide/diodes Moreover, this change in beam path can then be effectively used to selectively direct (i.e. switch) the optical signal as an output from the waveguide/diode onto either of two output optical waveguides.

In light of the above, it is an object of the present invention to provide a reverse bias switching/modulating diode wherein the switching element is itself an optical waveguide. Another object of the present invention is to provide a reverse bias switching/modulating diode that effectively provides for optical switching of higher order mode optical signals. Another object of the present invention is to control the loss/gain component ik of a modulator's index of refraction n+ik for the purpose of causing anisotropic changes in components of a light beam's flux energy (i.e. Poynting vector components $P_\parallel$ and $P^\perp$), to thereby change the propagation distance of the light beam, $\lambda_c$, for eventually switching the light beam from one waveguide to another. Yet another object of the present invention is to provide a reverse bias switching/modulating diode that is easy to manufacture, is simple to use, and is comparatively cost effective.

In another aspect of the pertinent technology, the present invention gives consideration to both the phase characteristics and the losses of an optical signal as it transits through an optical waveguide/diode. Mathematically, these considerations are given in the expression for the waveguide/diode's index of refraction:

$$n = (n_o + \Delta n_o) + i(\alpha_o + \Delta \alpha_o)$$

In this expression $n_o$ and $\alpha_o$ are measures of the intrinsic properties of the waveguide/diode. On the other hand, $\Delta n_o$ and $\Delta \alpha_o$ respectively account for a plasma dispersion effect in the PN junction (phase factor) and losses due to absorption effects in the waveguide/diode (loss factor). An important consequence here is that when these factors are considered together, the index of retraction n varies along a cross-section dimension of the waveguide/diode due to free electron and hole distributions variations around the PN junction.

As disclosed above, an optical signal with higher order modes will follow a sinusoidal path as it transits through an optical waveguide/diode. An important characteristic of this path is the propagation interference distance $\lambda_c$ that is traveled by the optical signal, in a $\pi$ cycle, as the optical signal travels from one side of the waveguide/diode to the opposite side of the waveguide/diode.

With the above in mind, when both phase and loss factors are considered, it is to be appreciated that the propagation interference distance $\lambda_c$ can be expressed as:

$$\lambda_c = \lambda_{cn} + \Delta\lambda_{cn} + \Delta\lambda_{ca}$$

where, $\lambda_{cn}$ is a constant that is set by the physical characteristics of the waveguide/diode, while $\Delta\lambda_{cn}$ and $\Delta\lambda_{ca}$ are consequences of the phase and loss factors presented in the expression given above for the waveguide/diode's index of refraction, $n = (n_o + \Delta n_o) + i(\alpha_o + \Delta\alpha_o)$.

Specifically, in the expression for n given above, $\Delta\lambda_{cn}$ is an increment that is controlled by $\Delta n_o$, and $\Delta\lambda_{ca}$ is an increment that is controlled by $\Delta\alpha_o$. Thus, during each transit of an optical signal through the PN junction of a waveguide/diode, the optical signal will experience a change in the propagation interference length $\Delta\lambda_c$ due to both phase and loss factors: i.e. $\Delta\lambda_c = \Delta\lambda_{cn} + \Delta\lambda_{ca}$.

Importantly, because the fundamental mode of an optical signal is less attenuated than the higher order modes in the depletion region, $W_d$, of the PN junction, the fundamental mode has relatively less propagation loss during a $\pi$ cycle. Accordingly, with less propagation loss, the energy in the fundamental mode is more pronounced. Consequently, $\Delta\lambda_{cn}$ remains relatively constant while $\Delta\lambda_{ca}$ increases with propagation distance and the difference between the two, $\Delta\lambda_c$, also increases. Stated differently, $\Delta_c$ is distance-dependent and is effectively stretched as it transits the waveguide/diode. Moreover, these changes ($\Delta\lambda_{ca}$ and $\Delta\lambda_{cn}$) are cumulative during the transit of the optical signal through the waveguide/diode.

From an energy perspective it is known that the propagation of a light beam's energy flux can be characterized by a Poynting vector, P. By definition, at any point in time, the Poynting vector will have both a magnitude and a direction. In the specific case when the light beam travels as a multimode optical wave on a zigzag path along the axis of a multimode optical waveguide, the Poynting vector can be resolved into a component $P_\parallel$ that is directed along the axis of the multimode optical waveguide and a component $P^{195}$ that is directed perpendicular to the axis.

When specifically considering the Poynting vector P of a light beam at the point where it is incident on a material having a spatial varying index of refraction n+ik along the waveguide cross-section, it is known that the loss/gain component ik of this index of refraction will introduce losses or gains that alter the direction of the vector P. In detail, it is known that under the influence of ik, the components and $P_\parallel$ will $P^\perp$ vary with different loss/gain values in an anisotropic manner. The important consequence here is that the direction of the Poynting vector can be controlled by altering the index of refraction n+ik.

SUMMARY OF THE INVENTION

In accordance with the present invention, an optical waveguide is created as a reverse bias switching/modulating diode for use as the switching element of an optical modulator. For this purpose, the optical waveguide is made as a PN junction using a semiconductor material (e.g. silicon) having an effective index of refraction n. During its manufacture, the optical waveguide is doped to create a P-typo region and an N-type region. A consequence here is that a space charge region is also created between the two regions, and this space charge region will have a depletion width $W_d$ which is determined by the electrical characteristics of the P-type region and the N-type region. In this combination, the optical vvaveguide has a first end and a second end with the P-type region, the N-type region, and the space charge region, all extending together between the first and second ends of the waveguide. This construction effectively creates a waveguide/diode.

At least one optical input waveguide is connected to the first end of the waveguide/diode to provide an optical input signal that will transit through the waveguide/diode. As mentioned above, it is an important feature of the present invention that this optical input signal have a dominating higher order mode, e.g. a second order mode signal. Thus, to achieve this purpose for the present invention, two optical input waveguides need to be positioned at a predetermined location at the first end of the waveguide/diode. In particular, with the waveguide/diode defining a central axis, the predetermined location for connecting the two input optical waveguides to the waveguide/diode needs to be offset oppositely from the central axis by an offset distance $d_{offset}$. The input light beam is guided into one of the two input waveguides and it will be cross-coupled between the two waveguides to create a higher order mode input signal, when transitioning into the waveguide/diode section.

In addition to the optical input waveguide, the present invention envisions there will also be two output waveguides which are each attached to the second end of the waveguide/diode. Preferably, each of the optical output waveguides are attached to separate areas of the second end of the waveguide/diode, and they will be symmetrically positioned relative to the central axis of the waveguide/diode.

A voltage source is connected to the waveguide/diode on opposite sides of its space charge region to establish a reverse bias for the waveguide/diode when a base voltage $V_{base}$ is applied to the waveguide/diode. Thereafter, a switching voltage $V_\pi$ can be selectively added to (or subtracted from) $V_{base}$ to increase (decrease) the electric field in the space charge region. In the event, this also simultaneously changes the depletion width $W_d$ in the space charge region. With this change in the depletion width $W_d$ of the space charge region, the effective index of refraction n of the waveguide/diode also changes. As disclosed in greater detail below, this change in the effective index of refraction n, due to the change of depletion width $W_d$ in the space charge region, allows the present invention to direct the input optical signal onto a preselected output optical waveguide at the second end of the waveguide/diode.

For an operation of the present invention, the base voltage $V_{base}$, the switching voltage $V_\pi$ and the manufactured profile of the P-type region and the N-type region of the waveguide/diode will each, individually or collectively, account for the depletion width $W_d$ of the space charge region. Recall, it is the base voltage $V_{base}$ and the PN junction profile that establish the reverse bias for the waveguide/diode. On the other hand, it is the switching voltage $V_\pi$, alone, that operationally changes the depletion width $W_d$ and its corresponding free carrier concentration in the space charge region. According to the plasma dispersion effect, the change of free carrier concentration will change its corresponding index of refraction. Thus, the effective index of refraction n will be changed along with the switching voltage $V_\pi$. Importantly, when $V_\pi$ has changed n, the path of a higher order made optical signal will experience a change in its higher order mode propagation interference distance $\lambda_c$ each time it transits through the space charge region. Accordingly, this change of $\lambda_c$ is cumulative along a length L of the waveguide/diode. As a consequence, with an appropriate design consideration of $V_\pi$ and L, the present invention is able to direct the input optical signal from one output optical waveguide onto the other output optical waveguide.

Mathematically, considerations for the present invention include the recognition that the length L of the waveguide/diode, the higher order mode propagation interference distance $\lambda_c$, and the changes in $\lambda_c$ (i.e. $\Delta\lambda_c$), are related through the expressions: $L=N\lambda_c$ and $\lambda_c \cong (N\pm 1)\Delta\lambda_c$, where N is a positive real number greater than 10. For the present invention the length L is preferably greater than 100 μm and, preferably, $V_{base}+V_\pi<10$ volts.

For an alternate embodiment of the present invention, the structure of a waveguide/diode incorporates a PN junction that can include two different semiconductor materials. Specifically, for the waveguide/diode of the alternate embodiment, a P-type region is made of a semiconductor material having a first plasma dispersion effect (e.g. silicon). Its N-type region is then made of a different semiconductor material which has a different plasma dispersion effect (e.g. InGaAsP). In combination, the two different semiconductor materials are bound directly to one another, or they can be separated and bounded (i.e. joined) together by an oxide layer (e.g. silica).

Operationally, the alternate embodiment functions as similarly disclosed for the preferred embodiment. The alternate embodiment, however, provides different electrical capabilities that allow for flexibility in the design and use of structural components for improved performance characteristics. In particular, a significant operational factor of the alternate embodiment is the fact that the plasma dispersion effect of the N-type region (e.g. InGaAsP) is more than two times greater in magnitude than that of the P-type region (e.g. silicon).

Due to the disparity between the respective plasma dispersion effects, the structural design features of the present invention that can be most easily varied to improve overall performance include: 1) the magnitude of the switching voltage $V_\pi$, which can be lower, and 2) the length L of the waveguide/diode, which can be shorter than is otherwise possible. Moreover, as will be appreciated by the skilled artisan, the operational parameters $V_\pi$ and L are interrelated by a figure of merit defined as $V_\pi L$. Thus, they can be respectively selected to balance each other.

In accordance with the present invention, the waveguide/diode is manufactured based on a collective consideration of all modes in an optical signal, i.e. the fundamental (first mode) as well as the higher order modes. In particular, consideration is directed to an index of refraction n for the vvaveguide/diode that accounts for a plasma dispersion effect in the PN junction and losses due to absorption effects in the waveguide/diode. Specifically, $n=(n_o+\Delta n_o)+i(\alpha_o+\Delta\alpha_o)$.

An important consequence of the index of refraction n is that the propagation interference distance $\lambda_c$ of the optical signal is seemingly stretched. Mathematically this consequence results from the fact that when both phase and loss factors are considered, the propagation interference distance $\lambda_c$ for a multi-mode optical signal can be expressed as: $\lambda_c=\lambda_{cn}+\Delta\lambda_{cn}+\Delta\lambda_{ca}$. In this case, $\lambda_{cn}$ is a constant that is set by the physical characteristics of the waveguide/diode, while $\Delta\lambda_{cn}$ and $\Delta\lambda_{ca}$ are consequences due to the phase and loss factors in the expression for the index of refraction n.

Operationally, when a voltage source is connected with the PN junction and provides a base voltage $(V=V_{base})$, n varies along the length L of the waveguide/diode. Thus, a distance-dependent propagation interference distance $\lambda_c$ is created for the optical signal. Further, when a switching voltage $V_\pi$ is selectively applied (i.e. $V=V_{base}+V_\pi$), a different distance-dependent, propagation interference distance $\lambda_c'$ is created for the optical signal. The result is a change in the distance-dependent interference distance, $\Delta\lambda_c$. In detail, $\Delta\lambda_c$ for the optical signal is equal to $\lambda_c'-\lambda_c$ (i.e. $\pm\Delta\lambda_c=\lambda_c'-\lambda_c$). As envisioned for the present invention, with the change $\Delta\lambda_c$ the optical signal can be switched from one pathway to another at the length L. In the waveguide/diode when $\int \Delta\lambda_c=\lambda_c$.

With the above considerations in mind, it happens that the length L necessary for switching an optical signal from one pathway to another has been found to be substantially less than the L required for a waveguide/diode when only phase factors are considered. Thus, it is possible to establish a shorter length L between the first end and the second end of the waveguide/diode to switch the optical signal from one pathway to another at the length L, when $\int \Delta\lambda_c=\lambda_c$.

For an alternate embodiment of the present invention, a structure and methodology are provided for a multimode optical waveguide. Specifically, this structure includes two optical waveguides that are juxtaposed, side-by-side, to define an axis for the multimode optical waveguide. A modulator is positioned along the axis between the two optical waveguides to establish an interference region that extends along a predetermined axial length L of the multimode optical waveguide.

It is an important aspect of this alternate embodiment for the present invention that the modulator is recognized to have an index of refraction n+ik, wherein ik is a loss/gain component to n. With this in mind, a base condition for the multimode optical waveguide is defined. Specifically, the base condition exists when the change in propagation distance of a light beam (carrier wave) traveling on a zigzag path through the multimode optical waveguide results in a loss or gain of one wavelength λ. This occurs along multimode optical waveguide at the axial length L.

As intended for the present invention, when an external stimulus is applied to the modulator its index of refraction n+ik changes. Consequently, along the length L, the light beam that passes back and forth through the stimulated modulator will experience a change in its propagation length that is equal to $\lambda_c$. For purposes of the present invention $\lambda_c=\pm 180°$ at the length L. Also, at the length L the energy in the light beam will be effectively switched from one waveguide to the other.

From an energy perspective, the light beam (carrier wave) can be characterized by a Poynting vector P having one component $P_\parallel$ that is parallel to the axis of the multimode optical waveguide, and another component $P^\perp$ that is perpendicular to the axis. As recognized for the present invention, when the modulator is being influenced by an external stimulus as described above, the loss/gain component ik of the index of refraction n+ik causes anisotropic changes in $P_\parallel$ and $P^\perp$. The consequence here is a change in the propagation distance of the light beam that is equal to $\Delta\lambda_c$. This occurs each time the light beam passes through the modulator.

From the perspective of the Poynting vector, P, for a light beam (carrier wave), consider first a base condition for the multimode optical waveguide wherein the vector P intercepts the modulator at an incident angle θ. In this case, when an external stimulus is applied to the modulator, the direction of the Poynting vector P will be changed by an increment $\pm\Delta\theta$. Consequently, the propagation interference distance of the carrier wave will change by an increment $\pm\Delta\lambda_c$. In particular, this will happen each time the carrier wave passes through the interference region. Furthermore, the angle change in a cycle is $\pm\Delta\theta$ with the additional angle change accumulated over prior cycles. The result here is the $\int\Delta\lambda_c=\pm\lambda_c$ at the length L and thus, the energy of the carrier wave is essentially shifted from the first waveguide to the second waveguide. Succinctly stated, along the length L, $\int\Delta\lambda_c=\lambda_c$. As noted above, $\lambda_c$ is the 180° change in the light beam wavelength after travelling the propagation distance L that is necessary to switch the light beam from one waveguide to the other.

In accordance with the present invention, at least three versions of structure are envisioned. For each version, it is to be noted that the modulator is made of a semiconductor material.

In the first version of the present invention, the modulator includes a semiconductor PIN diode. Also, a voltage source is connected to the PIN diode so that its index of refraction n+ik can be controlled by electric current injection from the voltage source. Thus, this control of the PIN diode causes $\pm\Delta\theta$ changes in the angle of incidence for the Poynting vector P of the light beam (carrier wave). In turn, this causes consequent changes in $\pm\Delta\lambda_c$ that eventually switch the carrier wave from one waveguide to the other.

For a second version of the present invention, the modulator includes a semiconductor optical amplifier having a gain section. Like the first version, the index of refraction n+ik in the optical amplifier's gain section is altered by a current injection from a voltage source. Again, the resulting change in $\pm\Delta\theta$, with a consequent change in $\pm\Delta\lambda_c$ occurs to switch the carrier wave from one waveguide to the other.

For a third structural version of the present invention, like the second version, the modulator includes a semiconductor optical amplifier having a gain section. In this third version, however, the system relies on the fact that the carrier wave will have a predetermined wavelength $\lambda_a$. Also, the system includes a modulating light source for injecting a modulating light wave having a wavelength $\lambda_b$ into the second optical waveguide. The modulating light wave with wavelength $\lambda_b$ then interacts with the carrier wave in the multimode optical waveguide to modulate $\lambda_a$. In this case, a bias current is created by a voltage source in the gain section of the modulator to establish a base condition for the carrier wave. Preferably, $\lambda_a>\lambda_b$ to cause $\pm\Delta\theta$, with a consequent change in $\pm\Delta\lambda_c$ that occurs to switch the carrier wave from one waveguide to the other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
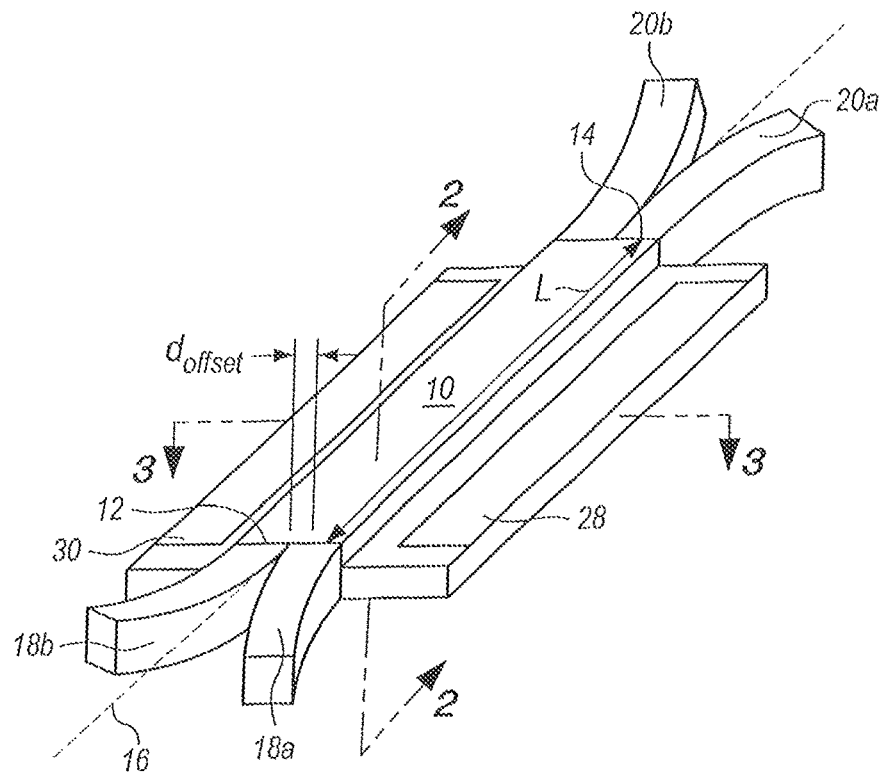
FIG. 1 is a perspective view of a waveguide/diode in accordance with the present invention.

Referring initially to FIG. 1, a waveguide/diode in accordance with the present invention is shown and is generally designated 10. Preferably, the waveguide/diode 10 is made of a semiconductor material, such as silicon. Also, as shown, the waveguide/diode 10 preferably has an elongated body portion that extends through a length L from a first end 12 to a second end 14, and it defines a central axis 16. Further, two input optical waveguides 18a and 18b are attached to the first end 12 of the waveguide/diode 10, and a pair of output optical waveguides 20a and 20b are attached to the second end 14 of the waveguide/diode 10.

Figure 2:
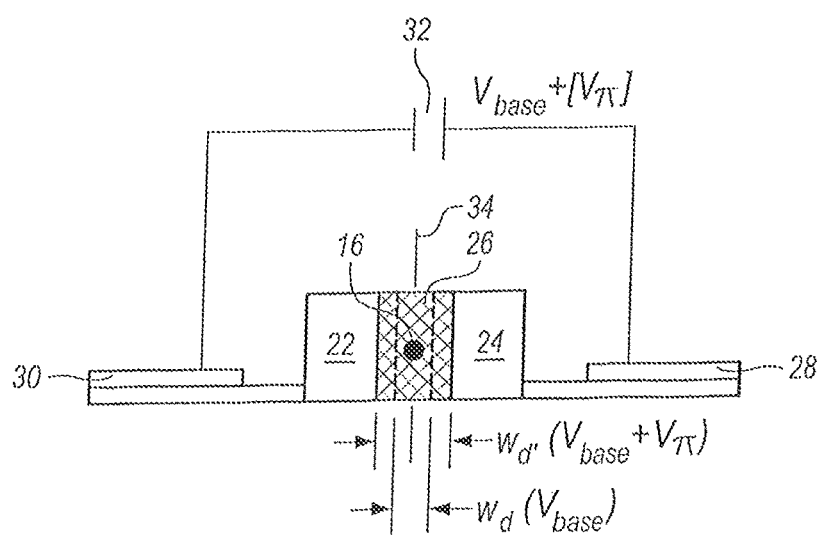
FIG. 2 is cross-section view of the waveguide/diode as seen along the line 2-2 in FIG. 1, showing a profile of the PN junction of the present invention.

By referring to FIG. 2, it will be appreciated that the waveguide/diode 10 includes a P-type region 22 and an N-type region 24, with a cross charge region 26 that is located between them. Functionally, for purposes of the present invention, the P-type region 22 and the N-type region 24 of the waveguide/diode 10, together with the cross charge region 26, present a typical PN profile that is like any PN junction known in the pertinent art. Further, like any diode known in the pertinent art, the waveguide/diode 10 of the present invention includes an anode 28 and a cathode 30 that are respectively connected with a voltage source 32. For the present invention, because the anode 28 (positive) is connected to the N-type region 24 of the waveguide/diode 10, and the cathode 30 (negative) is connected to the P-type region 22, the waveguide/diode 10 is reverse biased.

Still referring to FIG. 2, it is to be appreciated that the voltage source 32 will generate a base voltage $V_{base}$ which establishes the reverse bias for the waveguide/diode 10. In addition to $V_{base}$, the voltage source 32 will also provide a switching voltage $V_\pi$ that is necessary for an operation of the present invention. The importance here is that, as shown in FIG. 2, with only $V_{base}$ applied, the depletion width $W_d$ of the cross charge region 26 will be different from the depletion width $W_d'$ that results when the switching voltage $V_\pi$ is applied. The consequence here is that as the switching voltage $V_\pi$ changes the depletion width between $W_d$ (dashed lines) and $W_d$ (solid lines), the effective index of refraction n of the waveguide/diode 10 having the cross charge region 26 will also be changed.

Figure 3:
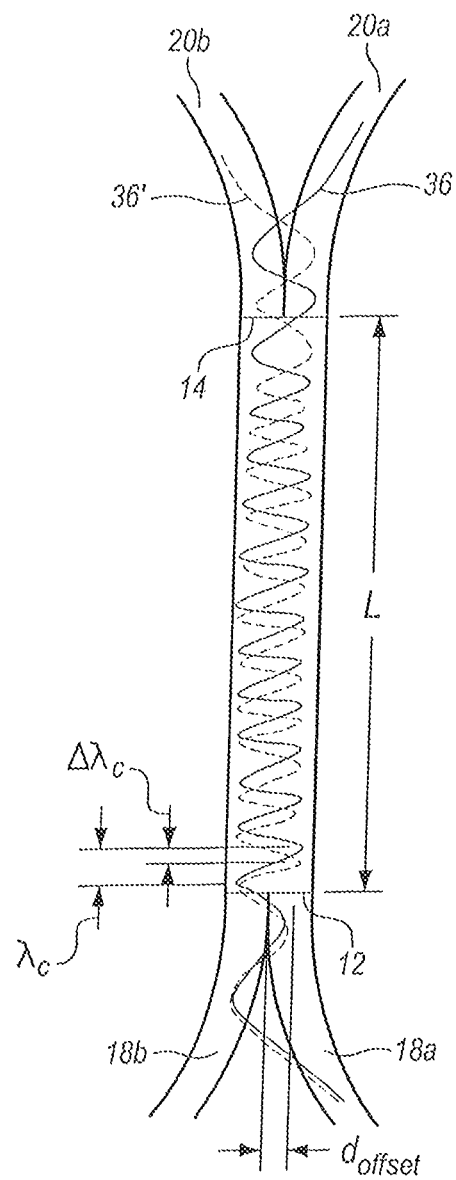
FIG. 3 is a cross-section view of the waveguide/diode as seen along the line 3-3 in FIG. 1 showing the difference in beam paths between a light beam that is influenced by a switching voltage $V_\pi$ (dashed line) and one that is not influenced (solid line)

In another aspect of the present invention, it is an important feature that the two input optical waveguides 18a and 18b be eccentrically attached to the first end 12 of the waveguide/diode 10. This attachment should be made at a predetermined location that is at an offset distance $d_{offset}$ from the central axis 16. Specifically, this is done to create higher order modes (e.g. in particular, a second order mode) for optical signals as they transit the length L of waveguide/diode 10. As best seen in FIG. 3, the purpose of creating a higher order mode for an optical signal is to have it proceed through the waveguide/diode 10 on a sinusoidal wave path 36/36' having a mode propagation interference length $\lambda_c$, rather than along a straight path as would be the case for an optical signal having only a single, fundamental mode.

For an operation of the present invention, an optical signal enters the waveguide/diode 10 from the input optical waveguide 18a. The signal can then be directed from the waveguide/diode 10 onto either the output optical waveguide 20a or the output optical waveguide 20b simply by applying, or withholding, the switching voltage $V_\pi$. Functionally, this happens because $V_\pi$ causes the depletion width $W_d$ of the cross charge region 26 to change. Consequently, the effective index of refraction n of the waveguide/diode 10 having the cross charge region 26 will also change. In turn, as the optical signal transits the length L of the waveguide/diode 10 back and forth through the cross charge region 26 in the plane 34, the second order mode propagation interference distance, $\lambda_c$, of the optical signal also changes by an increment of $\Delta\lambda_c$ as shown in FIG. 3. As all this happens, $\Delta\lambda_c$ is cumulative for each time the wave path 36/36' of the optical signal passes through the cross charge region 26. Accordingly, instead of following an unaltered wave path 36, the summation of $\Delta\lambda_c$ increases along the wave path 36' of the optical signal as it progresses through the waveguide/diode 10. The consequence for the wave path 36 of the optical signal is that it can be changed to a wave path 36' for directing the optical signal from one output optical waveguide 20a onto the other output optical waveguide 20b, or vice versa. Mathematical expressions to support this consequence are satisfied when L and N are selected such that switching occurs when $L=N\lambda_c$ and $\lambda_c \cong (N\pm 1)\Delta\lambda_c$, where N is a positive real number greater than 10.

Figure 4:
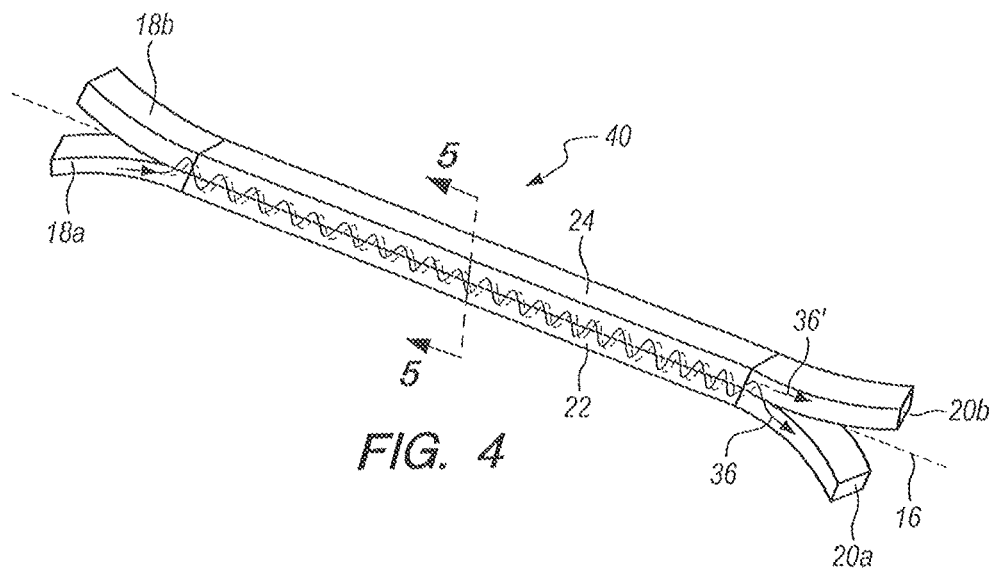
FIG. 4 is a perspective view of an alternate embodiment of the present invention.

Referring now to FIG. 4 an alternate embodiment for the waveguide/diode of the present invention is shown and is generally designated 40. As shown, the waveguide/diode 40 is structurally similar to the waveguide/electrode 10 disclosed above. Both waveguide/diodes 10 and 40 have a similar purpose, and they function similarly. They differ from each other in the nature of the materials used for their manufacture and their consequent electrical characteristics. In detail, the distinctive characteristics of the waveguide/diode 40 will be best appreciated with reference to FIG. 5.

Figure 5:
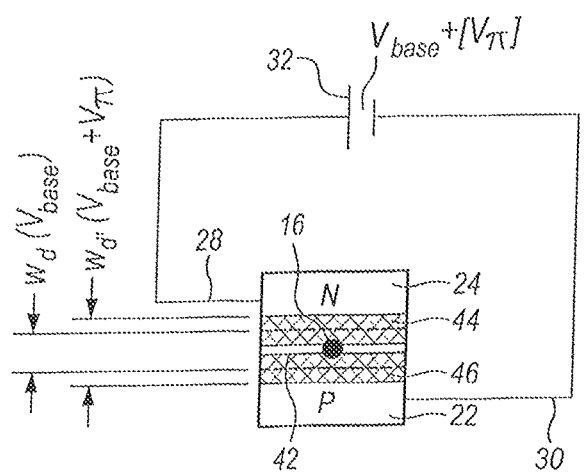
FIG. 5 is a cross-section view of the waveguide/diode as seen along the line 5-5 in FIG. 4.

With reference to FIG. 5 it is to be appreciated that the P-type region 22 and the N-type region 24 are made of different semiconductor materials. In particular, the difference is characterized by the fact that the regions 22 and 24 each exhibit a different plasma dispersion effect. Nevertheless, the P-type region 22 and the N-type region 24 need to be somehow bonded, or joined, together.

As shown in FIG. 5, the present invention envisions the use of an oxide layer 42 for the purpose of joining the regions 22 and 24 together. For example, the present invention envisions a PN junction wherein the N-type region 24 is made of a Multiple-quantum-well (MOM) material such as Indium-Gallium-Arsenide-Phosphide (InGaAsP). In combination with this N-type region 24, the P-type region 22 is envisioned to be silicon (Si), and the oxide layer 42 is silica ($SiO_2$). Other combinations of materials are, or course, possible. In each combination, however, it is important that the two materials are different, and that they will, accordingly, have different plasma dispersion effects.

A consequence of the waveguide/diode 40 is that the N-type region 24 will exhibit an N depletion region 44, and the p-type region 22 will exhibit a P depletion region 46. Together these regions 44 and 46 function similarly to the space charge region 26 of the waveguide/diode 10. In a variation for the alternate embodiment of the waveguide/diode 40, the present invention envisions in a different embodiment, an elimination of the oxide layer 42. In this case, the present invention envisions that the N-type region 24 and the P-type region 22 will be grown together.

In another embodiment of the present invention the current waveguide/diode can also be realized in a structure similar to that shown in FIG. 1 and FIG. 2. In this case, the PN junction waveguide/diode is made of a P-type region 22 from a first semiconductor material (e.g. poly-silicon), an N-type region 24 from a second semiconductor material (e.g. InGaAsP), and a buffer oxide material (e.g. silica) between the P-type semiconductor and the N-type semiconductor.

FIGS. 6A-D are to be considered collectively as they all pertain to the same multi-mode optical signal during its transit through the waveguide/diode 10. The import here, however, is not so much on distance traveled but rather on the back-and-forth changes in the location of energy in the waveguide/diode 10. In particular, these changes are most important relative to the effect caused by the cross charge region 26 of a PN junction in the vvaveguide/diode 10. With this in mind, the disclosure below regarding FIGS. 6A-D is directed to energy amplitudes of the various modes in a multi-mode optical signal.

Figure 6A:
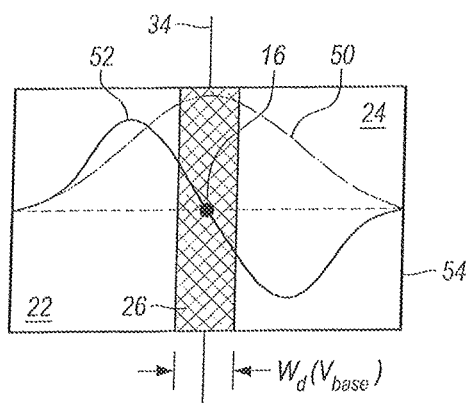
FIG. 6A is a graphical comparison showing exemplary energy amplitude levels of the first (fundamental) mode and the second order mode in an optical signal over a cross-section dimension of the waveguide/diode as seen along the line 2-2 in FIG. 1.

FIG. 6A depicts an energy amplitude 50 for the fundamental mode of a multi-mode optical signal, together with an energy amplitude 52 for the higher order modes (primarily second order) of the optical signal. In FIG. 6A, the energy amplitudes 50 and 52 are shown in a same cross-section 54 of the waveguide/diode 10 with their respective relationship to the cross charge region 26 of a PN junction. It is important to note in FIG. 6A that the energy amplitude 50 of the fundamental mode is less affected by the cross charge region 26 (i.e. plasma dispersion effect) than is the energy amplitude 52 of the higher order modes. Stated differently, the higher order modes are more attenuated.

Figure 6B:
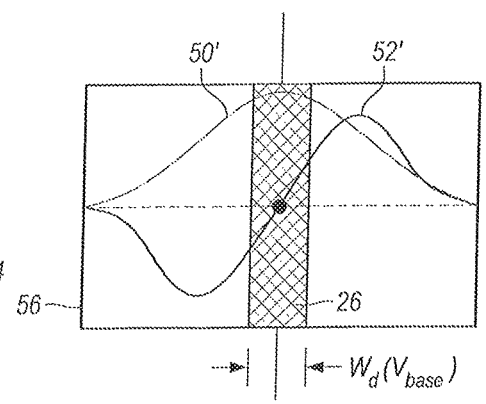
FIG. 6B is a graphical comparison showing exemplary energy amplitude levels in the first (fundamental) mode and the second order mode of the optical signal shown in FIG. 6A after one π cycle of the optical signal.

FIG. 6B depicts the optical signal at a subsequent cross-section 56, after the optical signal has completed a $\pi$ cycle.

At the cross-section 56 it is noted that the energy amplitude 50' of the optical signal is substantially unchanged and is similar to the previous energy amplitude 50 profile it had at cross-section 54 (FIG. 6A). On the other hand, unlike the fundamental mode, the higher order modes have actively interacted with the cross charge region 26. Accordingly, the profile of the energy amplitude 52' for the higher order modes has changed. The consequence here is two-fold. For one, because the energy amplitudes 50 and 52 for the optical signal are cumulative, the combined energy amplitude 58 for the optical signal effectively follows the frequency of the fundamental mode. For another, due to its increased interaction with the cross charge region 26, the higher order modes experience greater losses.

Figure 6C:
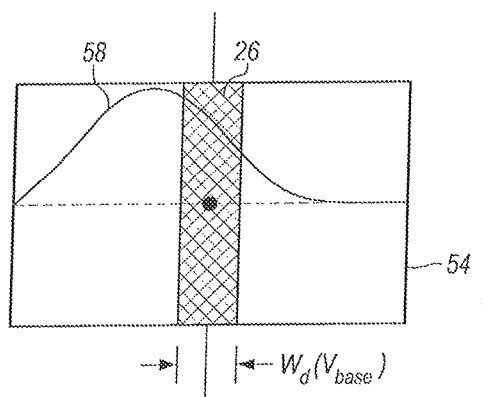
FIG. 6C is a depiction of the effect of the combined energy amplitude levels shown in FIG. 6A.
Figure 6D:
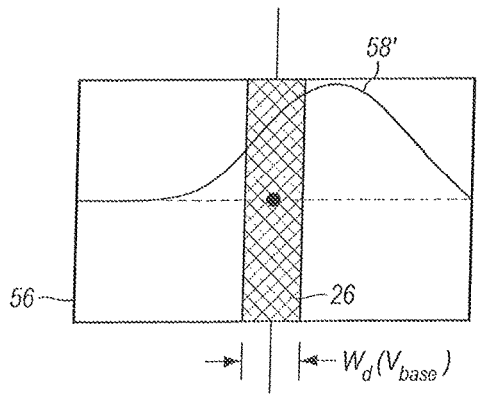
FIG. 6D is a depiction of the effect of the combined energy amplitude levels shown in FIG. 6B.

With reference to FIGS. 6C and 6D, it will be seen that the combined (total) energy 58 in an optical signal stays relatively constant in amplitude, but changes location in the waveguide/diode 10. Specifically, FIG. 6C shows the combined (total) energy amplitude 58 of the optical signal at cross section 54, and FIG. 6D shows the combined (total) energy amplitude 58' of the optical signal at cross-section 56. Thus, the optical signal is shown to effectively go back and forth from one cross-section (e.g. cross-section 54) to another (e.g. cross-section 56), and vice versa. As it does so, it transits through the cross charge region 26 of the waveguide/diode 10. With this in mind it is important to note that, from an energy perspective, the fundamental mode dominates and remains constant. The higher order modes, however, are more attenuated and thereby introduce continuously increasing losses.

Figure 7:
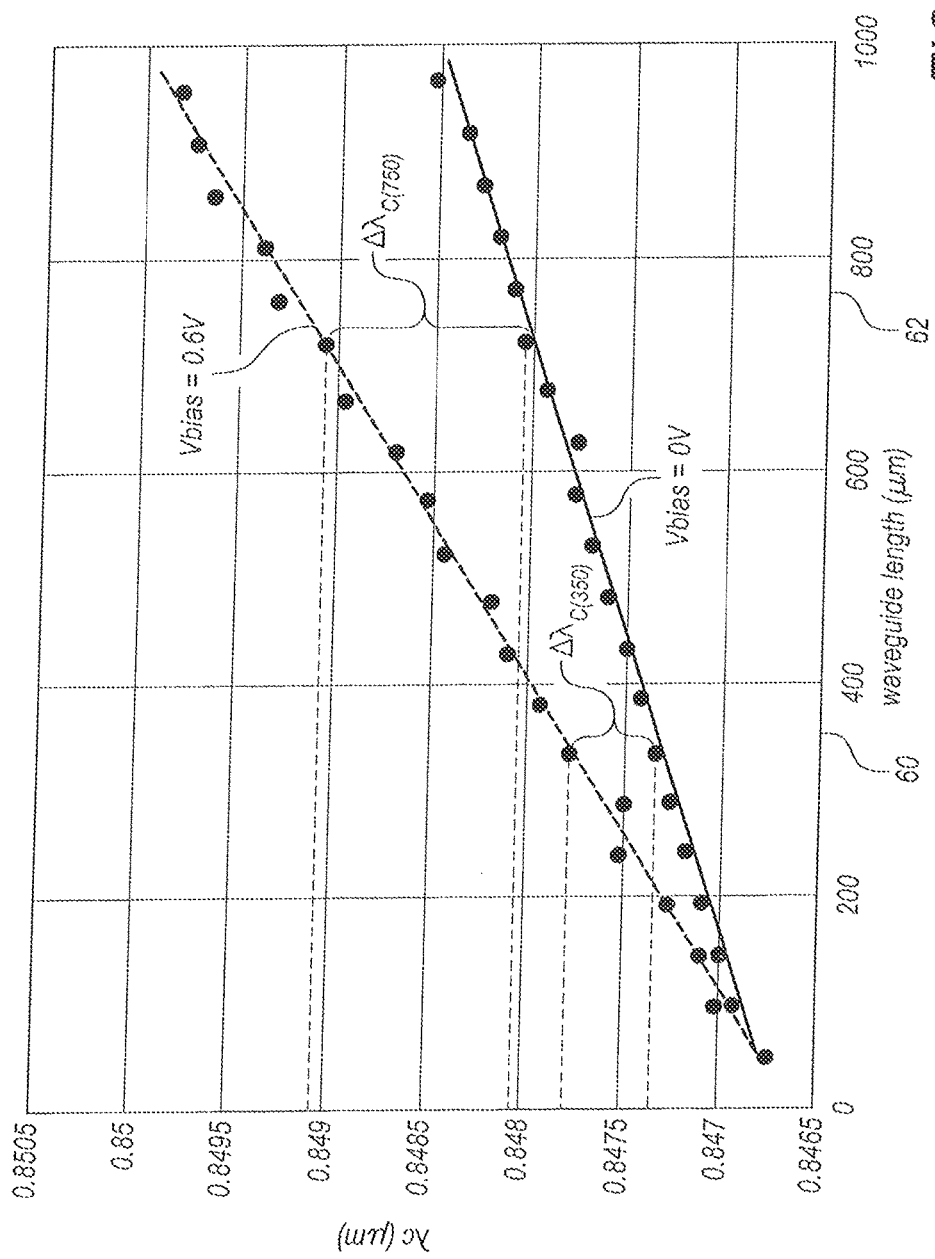
FIG. 7 is a representative graph showing changes in the interference length $\lambda_c$ of an optical signal relative to waveguide/diode; length under the influence of a change in voltage bias from the voltage source.

Referring now to FIG. 7, the distance-dependent, propagation interference changes, $\Delta\lambda_c$, are shown relative to the waveguide length L. In particular, these changes $\Delta\lambda_c$ are shown as a consequence in the bias voltage V. Of importance here is the fact that $\lambda_c$ itself changes at different rates, depending on the bias voltage V. The result of this is that the total $\Delta\lambda_c$ for a given length of waveguide/diode 10 is an integration of $\Delta\lambda_c$ along the given length, $\int\Delta\lambda_c$.

By way of example, consider the change in propagation interference distance $\Delta\lambda_{c(350)}$ at the point 60 on the waveguide/diode 10, i.e. when an optical signal has traveled 350 μm along the length L of the waveguide/diode 10. As indicated in FIG. 7, at the point 60, $\lambda_{c(350)}$ will have an approximated value of 0.8473 under the influence of a bias voltage of zero volts. On the other hand, $\lambda_{c(350)}$ will have a value of 0.8478 when the waveguide/diode 10 is under the influence of a bias voltage of 0.6 volts. The difference here produces a change in the interference distance $\Delta\lambda_{c(350)}$ of approximately 0.0005 μm. Now consider the propagation interference distance $\Delta\lambda_{c(750)}$ at point 62 on the waveguide/diode 10. At this time the same optical signal has traveled another 400 μm along the length L of the waveguide/diode 10 to the point 62. Again, depending of the voltage bias, at the point 62, $\lambda_{c(750)}$ will have a value of 0.8481 under the influence of a bias voltage of zero volts. On the other hand, $\lambda_{c(750)}$ will have a value of 0.8491 under the influence of a bias voltage of 0.6 volts. The difference here produces a change in the interference distance $\Delta\lambda_{c(750)}$ of approximately 0.0010 μm. Note: $\lambda_{c(750)}$ is approximately twice the interference distance $\Delta\lambda_{c(350)}$.

Figure 8:
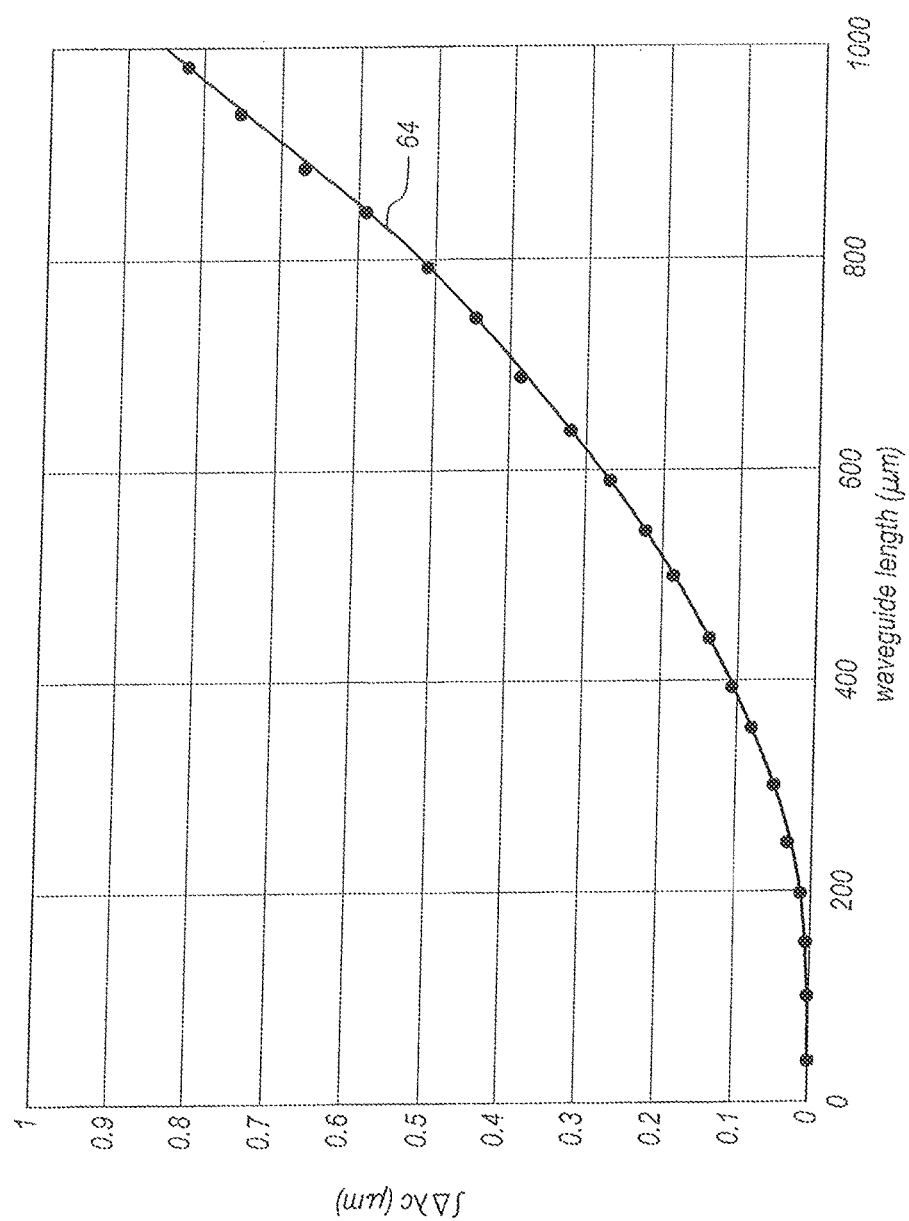
FIG. 8 is a graph showing the cumulative change in the interference length $\lambda_c$ of an optical signal as a function of waveguide length caused by a change in voltage bias as indicated in FIG. 7.

With the consequences of FIG. 7 in mind, FIG. 8 shows the integrated effect. Again by way of example, FIG. 8 shows that $\int\Delta\lambda_c$ results in a variation of $\lambda_c$ through a length L of the waveguide/diode 10 that is substantially a parabolic curve 64. This is so because $\Delta\lambda_c$ increases dramatically as the length L increases. Specifically, the values given in FIG. 8 are for a waveguide/diode 10 having a length L=1000 μm, with voltage changes between $V_{base}$=0 volts and a switching voltage $V_\pi$=0.6 volts. The result is an overall $\int\Delta\lambda_c$ that is equal to approximately 0.85 μm. Compare these values with those of FIG. 7 for a waveguide/diode: 10 having an index of refraction n that creates a distance-dependent, propagation interference distance $\lambda_c$. Specifically, for the example given, it is shown that the waveguide/diode 10 will switch a multi-mode optical signal from one pathway to another when $\int\Delta\lambda_c=\lambda_c$.

Figure 9:
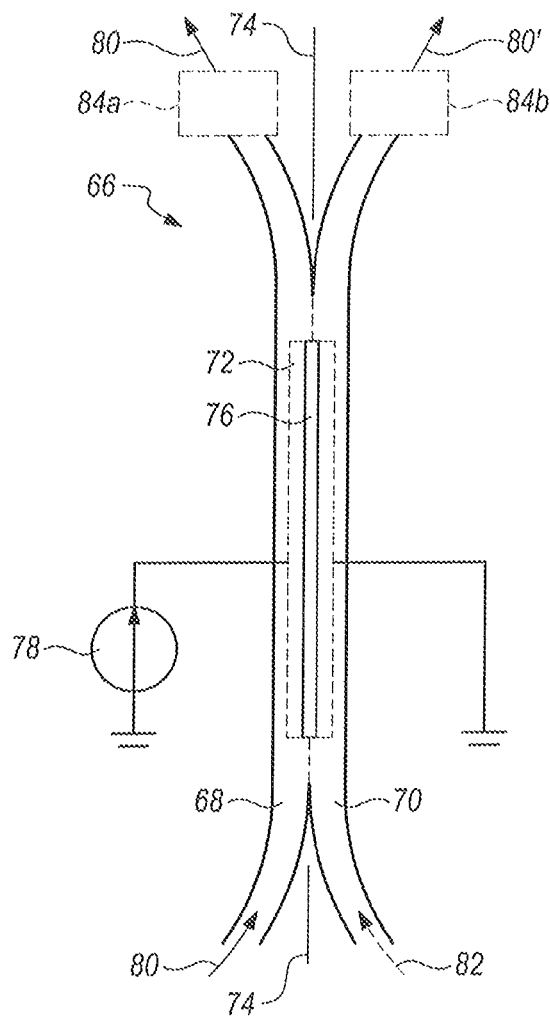
FIG. 9 is a schematic presentation of a multimode optical waveguide in accordance with the present invention.

An embodiment for the present invention that relies on controlling the Poynting vector of a carrier wave is shown in FIG. 9, where an elongated multimode optical waveguide is shown and is generally designated 66. As shown in FIG. 9, the waveguide 66 includes a first optical waveguide 68 and a second optical waveguide 70 that are juxtaposed with each other in a side-by-side relationship. In this combination, the waveguide 66 establishes an interference region 72 between the waveguides 68 and 70 which defines an axis 74 that extends longitudinally through the interference region 72.

FIG. 9 also shows that the multimode optical waveguide 66 includes a modulator 76 that is positioned in the interference region 72, and it includes a voltage source 78 that is connected with the modulator 76. Also, a light beam (carrier wave) 80 is shown being injected into the first waveguide 68 from a light source (device) not shown. As intended for the present invention, the purpose for an operation of the multimode optical waveguide 66 is to selectively shift the carrier wave 80 from the first optical waveguide 68 into the second optical waveguide 70.

It is also shown in FIG. 9 that a modulating light beam 82 can be injected into the second optical waveguide 70 simultaneously with injection of the carrier wave 80 into the first optical waveguide 68. In this case, the purpose of shifting the carrier wave 80 from the first optical waveguide 68 into the second optical waveguide 70 remains the same. Here, however, the necessary modulation of the carrier wave 80 is caused by its interaction with the modulating light beam 82. To do this, the wavelength $\lambda_a$ of the carrier wave 80 must differ from the wavelength $\lambda_b$ of the modulating light beam 82. Preferably, $\lambda_a$ will be substantially longer than $\lambda_b$. Further, for this variation of the multimode optical waveguide 66, optical filters 84a and 84b are positioned respectively at the outputs of waveguides 68 and 70 to filter $\lambda_b$ from further transmission of the carrier wave 80.

Figure 10:
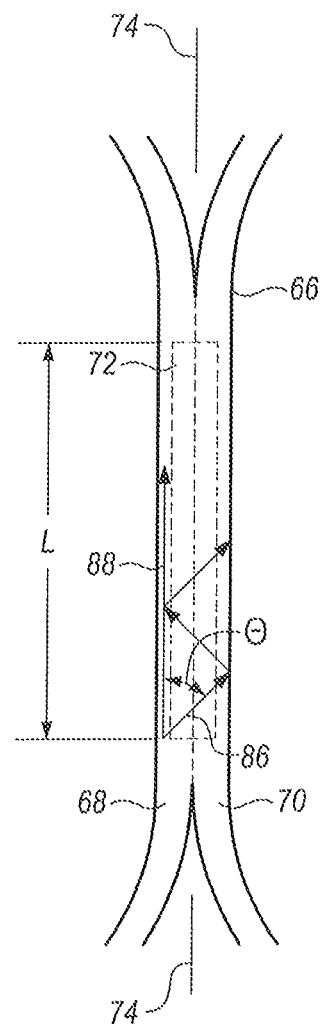
FIG. 10 is a plan view of the path for a Poynting vector as it propagates through a multimode optical waveguide having a configuration as shown in FIG. 9.

Referring now to FIG. 10, the Poynting vector 86 of carrier wave 80 is shown to follow a zig-zag path as it propagates through the multimode optical waveguide 66. In FIG. 10 the propagation direction of carrier wave 80 through the waveguide 66 is generally indicated by arrow 88 which is oriented parallel the axis 74. And, the carrier wave 80 comes into the interference region 72 at an initial incidence angle θ. Thus, the carrier wave 80 passes back and forth through the interference region 72 as it propagates through the multimode optical waveguide 66. Further, it is an important aspect of the present invention that the carrier wave 80 interacts with the modulator 76 along an axial length L as it passes through the interference region 72.

Figure 11:
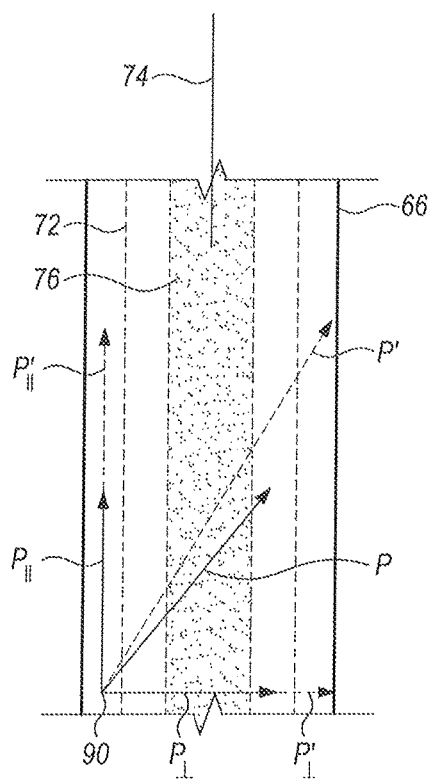
FIG. 11 is a depiction of exemplary anisotropic loss/gain variations in the orthogonal components of a Poynting vector under the influence of a modulating medium having a predetermined index of refraction.

In FIG. 11, the effect that the modulator 76 has on the Poynting vector P is shown with reference to a representative point of incidence 90. For purposes of the discussion here, it is at the point of incidence 90 that the carrier wave 80 enters the interference region 72. In detail, just prior to entering the interference region 72, the carrier wave 80 has a Poynting vector P' (represented by a dashed line) which is not influenced by the modulator 76. At the point of incidence 90, however, the Poynting vector P' can be selectively changed to a Poynting vector P. Specifically, this occurs when the modulator 76 is activated by the voltage source 78. Moreover, the vector change is due to increased spatial dependent optical loss from the resultant change on the index of refraction n+ik of material in the interference region 72.

Still referring to FIG. 11, it is shown that when the modulator 76 is not activated, the Poynting vector P' has orthogonal components $P_\parallel'$ and $P^{\perp'}$. In particular, $P_\parallel'$ is parallel to axis 74, and $P^{\perp'}$ is perpendicular to the axis 74. Similarly, when the modulator 76 is activated, the Poynting vector P has an orthogonal component $P_\parallel$ which is parallel to axis 74 and a component $P^\perp$ which is perpendicular to the axis 74. It is important to note that the changes from $P_\parallel'$ and $P^{\perp'}$ to $P_\parallel$ and $P^\perp$ are anisotropic.

Figure 12:
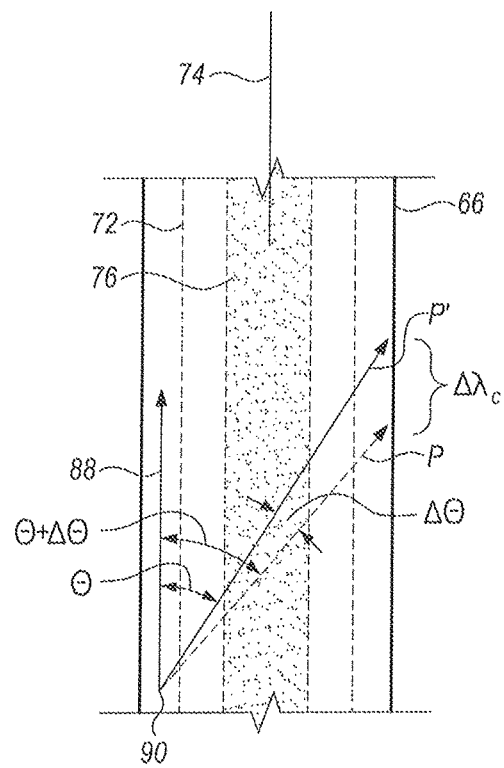
FIG. 12 shows the relationship between the starting and modulated conditions of a Poynting vector with the consequent change in incident angle $\Delta\theta$ upon contact with a refractive medium and the resultant change in wavelength propagation distance $\Delta\lambda_c$.

The consequence of activating the modulator 76 is best appreciated with reference to FIG. 12. There it will be seen that when the modulator 76 is activated, the angle of incidence θ for the carrier wave 80 is changed by an increment Δθ. The result of this Δθ is a change in the propagation distance of the Poynting vector P by a decrement $\Delta\lambda_c$. The end result of this at the distance L in the multimode optical waveguide 66 is that, after propagating through the length L, $\int\Delta\lambda_c = -\lambda_c$, and thus the carrier wave 80 is effectively switched from traveling on the first waveguide 68 to traveling on the second waveguide 70. It is noted that by deactivating the modulator 76 in the interference region, the carrier wave 80 will immediately return to travel (propagation) on only the first waveguide 68.

For purposes of the present invention the modulator 76 is made of a semiconductor material. In one embodiment this semiconductor material is a semiconductor PIN diode, and the index of refraction n+ik of the modulator 76 is controlled by electric current injection from the voltage source 78 causing ±Δθ. In another embodiment of the present invention, the semiconductor material is a semiconductor optical amplifier having a gain section. Again, the index of refraction n+ik of the modulator 76 is controlled by electric current injection from the voltage source 78 into the gain section of the optical amplifier for causing ±Δθ. In yet another embodiment of the present invention, the carrier wave 80 has a predetermined wavelength $\lambda_a$ and the carrier wave 80 is injected into the first vvaveguide 68. Also, a modulating light wave 82 which has a predetermined wave length $\lambda_b$ is injected into the second optical waveguide. Then, in the multimode optical waveguide 66 the carrier wave 80 and the modulating light wave 82 interact with each other to modulate the carrier wave 80 to cause ±Δθ. For this interaction, $\lambda_a$ is sufficiently longer than $\lambda_b$.

While the particular System arid Method for Controlling Energy Flux Modulation as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for controlling the energy flux of a light beam to switch the light beam from one waveguide to another, wherein the light beam is a carrier wave characterized by a Poynting vector P, the system comprising:

a first optical waveguide for receiving the carrier wave for transit there through;

a second optical waveguide, wherein the second optical waveguide is juxtaposed with the first optical waveguide along a length L to establish a multimode optical waveguide defining an axis and having an interference region along the axis between the first optical waveguide and the second optical waveguide;

a modulator, wherein the modulator is a semiconductor PIN diode having an index of refraction, n+ik, wherein ik is a loss/gain component and the modulator is positioned in the interference region amid the multimode optical waveguide for arrival of the Poynting vector P at the modulator with an incidence angle θ to create a distance dependent, propagation interference distance $\lambda_c$ in the carrier wave over the length L as the carrier wave passes back and forth through the interference region along a zigzag path in the multimode optical waveguide; and a voltage source connected to the modulator for selectively controlling an interaction between the modulator and the carrier wave to change the direction of the Porting vector P of the carrier wave by an increment ±Δθ, with a consequent change in the propagation interference distance of the carrier wave by an increment $\pm\Delta\lambda_c$, each time the carrier wave passes through the modulator, wherein $\int\Delta\lambda_c = \pm\lambda_c$ at the length L where the energy of the carrier wave is essentially shifted from the first waveguide to the second waveguide.

2. The system of claim 1 wherein the Poynting vector P for the carrier wave includes orthogonal components $P_\parallel$ and $P^\perp$ respectively representing components of carrier wave energy flux in directions parallel and perpendicular to the axis of the multimode optical waveguide.

3. The system of claim 2 wherein the index of refraction n+ik of the modulator is spatially varying, and the components $P_\parallel$ and $P^\perp$ of the Poynting vector P are respectively influenced by ik of the modulator with different loss/gain in an anisotropic manner to cause ±Δθ and $\pm\Delta\lambda_c$.

4. The system of claim 1 further comprising a voltage source connected to the PIN diode, wherein the index of refraction n+ik of the modulator is controlled by electric current injection from the voltage source into the PIN diode for causing ±Δθ.

5. The system of claim 1 wherein the voltage source is connected to the modulator, and wherein the index of refraction n+ik of the modulator is controlled by electric current injection from the voltage source into the gain section of the optical amplifier for causing ±Δθ.

6. The system of claim 5 wherein the carrier wave has a predetermined wavelength $\lambda_a$ and the system further comprises a modulating light source connected to the second optical waveguide for injecting light with a predetermined wave length $\lambda_b$ into the second optical waveguide for modulating the carrier wave, and wherein $\lambda_a > \lambda_b$ to cause ±Δθ.

7. A method for manufacturing a multimode optical waveguide to control the energy flux of a light beam to switch the light beam from one waveguide to another, wherein the light beam is a carrier wave characterized by a Poynting vector P, and the method comprises the steps of:

juxtaposing a first optical waveguide with a second optical waveguide along a length L to define an axis, and to create an interference region for the multimode optical waveguide along the axis between the first optical waveguide and the second optical waveguide;

positioning a modulator in the interference region, wherein the modulator is a semiconductor PIN diode, and wherein the modulator has an index of refraction, n+ik, and wherein ik is a loss/gain component;

connecting a voltage source to the modulator for selectively controlling an interaction between the modulator and the carrier wave to change the direction of the Poynting vector P of the carrier wave by an increment ±Δθ in its incidence angle θ with the modulator, to cause a consequent change in the distance dependent, propagation interference distance $\lambda_c$ of the carrier wave by an increment ±Δ$\lambda_c$, each time the carrier wave passes through the modulator along a zig-zag path in the multimode optical waveguide, with ∫Δ$\lambda_c$=±$\lambda_c$ at the length L where the energy of the carrier wave is essentially shifted from the first waveguide to the second waveguide.

8. The method of claim 7 wherein the Poynting vector P for the carrier wave includes orthogonal components $P_\parallel$ and $P^\perp$ respectively representing components of carrier wave energy flux in directions parallel and perpendicular to the axis of the multimode optical waveguide, and wherein the index of refraction n+ik of the modulator is spatially varying, and the components $P_\parallel$ and $P^\perp$ of the Poynting vector P are respectively influenced by ik of the modulator with different loss/gain in an anisotropic manner to cause ±Δθ and ±Δ$\lambda_c$.

9. The method of claim 7 wherein the index of refraction n+ik of the modulator is controlled by electric current injection from the voltage source into the PIN diode for causing ±Δθ.

10. A system for controlling the energy flux of a light beam to switch the light beam from one waveguide to another, wherein the light beam is a carrier wave characterized by a Poynting vector P, the system comprising:
a means for injecting the carrier wave into a multimode optical waveguide for transit therethrough, wherein the multimode optical waveguide defines an axis and has an interference region along an axial length L;
a means positioned in the interference region of the multimode optical waveguide having an index of refraction, n+ik wherein ik is a loss/gain component for influencing the Poynting vector P to create a distance dependent, propagation interference distance $\lambda_c$ in the carrier wave over the length L; and
a modulator, wherein the modulator is a semiconductor PIN diode for selectively controlling the index of refraction n+ik do of the means in the interference region to change the direction of the Poynting vector P of the carrier wave by an increment ±Δθ, with a consequent change in the propagation interference distance of the carrier wave by an increment ±Δ$\lambda_c$, each time the carrier wave passes through the interference region, wherein ∫Δ$\lambda_c$=±$\lambda_c$ at the length L to shift the energy of the carrier wave from one waveguide to the other waveguide.

11. The system of claim 10 wherein the means for injecting the carrier wave into a multimode optical waveguide is a light source for generating a light beam having a wavelength λ.

12. The system of claim 10 wherein the means for selectively controlling the index of refraction n+ik includes a voltage source connected to the means positioned in the interference region.

13. The system of claim 10 wherein the Poynting vector P for the carrier wave includes orthogonal components $P_\parallel$ and $P^\perp$ respectively representing components of the carrier wave energy flux in directions parallel and perpendicular to the axis of the multimode optical waveqiude, and wherein the index of refraction n+ik is spatially varying, and the components $P_\parallel$ and $P^\perp$ of the Poynting vector P are respectively influenced by ik of the modulator with different loss/gain in an anisotropic manner to cause ±Δθ and ±Δ$\lambda_c$.

\* \* \* \* \*

UNITED STATES PATENT AND TRADEMARK OFFICE
CERTIFICATE OF CORRECTION

PATENT NO. : 10,409,137 B2
APPLICATION NO. : 16/018663
DATED : September 10, 2019
INVENTOR(S) : Chen-Kuo Sun It is certified that error appears in the above-identified patent and that said Letters Patent is hereby corrected as shown below:

In the Specification

Column 2, Line 28 - after the word "the" and before the word "Moreover" DELETE "waveguide/diodes" and INSERT -- waveguide/diode. --.

Column 2, Line 42 - after the word "components" and before the ")" DELETE "$P_\parallel$and $P^\perp$" and INSERT -- $P_\parallel$ and $P_\perp$ --.

Column 2, Line 62 - after the word "of" and before the standalone letter "n" DELETE "retraction" and INSERT -- refraction --.

Column 3, Line 42 - after the word "a" and before the word "path" DELETE "zigzag" and INSERT -- zig-zag --.

Column 3, Line 45 - after the word "component" and before the word "that" on Line 46 DELETE "$P^{195}$" and INSERT -- $P_\perp$ --.

Column 3, Line 53 - after the word "components" DELETE the word "and".

Column 3, Line 54 - before the word "vary" DELETE "$P_\parallel$ will $P^\perp$" and INSERT -- $P_\parallel$ and $P_\perp$ will --.

Column 4, Line 1 - after the word "a" DELETE "P-typo" and INSERT -- P-type --.

Column 4, Line 7 - after the word "optical" and before the word "has" DELETE "vvaveguide" and INSERT -- waveguide --.

Column 5, Line 55 - before the word "that" DELETE "vvaveguide/diode" and INSERT -- waveguide/diode --.

Signed and Sealed this
Ninth Day of June, 2020

Andrei Iancu
*Director of the United States Patent and Trademark Office*

CERTIFICATE OF CORRECTION (continued)
U.S. Pat. No. 10,409,137 B2

Column 6, Line 15 - after the word "length" and before the word "the" DELETE "L. In" and INSERT -- L in --.

Column 6, Line 16 - DELETE "$\Delta\lambda_c = \lambda_c$" and INSERT -- $\Delta\lambda_c \approx \lambda_c$ --.

Column 6, Line 24 - after "$\int$" DELETE "$\Delta\lambda_c = \lambda_c$" and INSERT -- $\Delta\lambda_c \approx \lambda_c$ --.

Column 6, Line 40 - after the words "on a" DELETE "zigzag" and INSERT -- zig-zag --.

Column 6, Line 56 - after the word "component" and before the word "that" DELETE "$P^\perp$" and INSERT -- $P_\perp$ --.

Column 6, Line 61 - after the word "and" and before the "." DELETE "$P^\perp$" and INSERT -- $P_\perp$ --.

Column 8, Line 23 - after the word "diode" and before the word "length" DELETE ";".

Column 10, Line 16 - after the words "Multiple-quantum-well" and before the word "material" DELETE "(MOM)" and INSERT -- (MQM) --.

Column 12, Line 4 - after the words "waveguide/diode" and before the number "10" DELETE ":".

Column 13, Line 7 - after the word "vector" DELETE "P'has" and INSERT -- P' has --.

Column 13, Line 8 - after the word "and" and before the "." DELETE "$P^\perp{}'$" and INSERT -- $P_\perp{}'$ --.

Column 13, Line 9 - after the word "and" and before the word "is" DELETE "$P^\perp{}'$" and INSERT -- $P_\perp{}'$ --.

Column 13, Line 12 - after the word "component" and before the word "which" DELETE "$P^\perp$" and INSERT -- $P_\perp$ --.

Column 13, Line 14 - at the beginning of Line 14 and before the word "to" DELETE "$P^\perp{}'$" and INSERT -- $P_\perp{}'$ --.

Column 13, Line 14 - after the word "and" and before the word "are" DELETE "$P^\perp$" and INSERT -- $P_\perp$ --.

Column 13, Line 49 - after the word "System" and before the word "Method" DELETE "arid" and INSERT -- and --.

In the Claims

Column 13, Line 63 - after the word "transit" and before the ";" DELETE "there through" and INSERT -- therethrough --.

CERTIFICATE OF CORRECTION (continued)
U.S. Pat. No. 10,409,137 B2

Column 14, Line 12 - after the word "a" and before the word "path" DELETE "zigzag" and INSERT -- zig-zag --.

Column 14, Line 17 - before the word "vector" DELETE "Porting" and INSERT -- Poynting --.

Column 14, Line 26 - before the word "respectively" DELETE "$P^\perp$" and INSERT -- $P_\perp$ --.

Column 14, Line 31 - after the word "and" and before the word "of" DELETE "$P^\perp$" and INSERT -- $P_\perp$ --.

Column 15, Line 12 - before the word "respectively" DELETE "$P^\perp$" and INSERT -- $P_\perp$ --.

Column 15, Line 16 - after the word "and" and before the word "of" DELETE "$P^\perp$" and INSERT -- $P_\perp$ --.

Column 16, Line 26 - after the word "and" and before the word "respectively" DELETE "$P^\perp$" and INSERT -- $P_\perp$ --.

Column 16, Line 30 - after the word "and" and before the word "of" DELETE "$P^\perp$" and INSERT -- $P_\perp$ --.